(12) United States Patent
Andersen et al.

(10) Patent No.: US 7,890,320 B2
(45) Date of Patent: Feb. 15, 2011

(54) TOWER OF NUMERIC TYPES

(75) Inventors: Melitta Andersen, Omaha, NE (US);
Ryan Byington, Redmond, WA (US);
Brian Grunkemeyer, Redmond, WA (US); James S. Miller, Bellevue, WA (US); Anthony J. Moore, Seattle, WA (US); Ariel Weinstein, Elmont, NY (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 11/787,586

(22) Filed: Apr. 17, 2007

(65) Prior Publication Data

US 2008/0262801 A1    Oct. 23, 2008

(51) Int. Cl.
*G06F 7/00*    (2006.01)
(52) U.S. Cl. .................. 704/206; 708/204; 708/206; 707/756; 707/705
(58) Field of Classification Search .............. 708/204, 708/206; 707/756, 705
See application file for complete search history.

(56) References Cited

U.S. PATENT DOCUMENTS

| | | | |
|---|---|---|---|
| 5,572,642 A | 11/1996 | Nasu | |
| 5,933,641 A * | 8/1999 | Ma | 717/143 |
| 5,999,938 A | 12/1999 | Bliss et al. | |
| 6,052,526 A | 4/2000 | Chatt | |
| 6,400,287 B1 | 6/2002 | Ehrman | |
| 6,728,722 B1 | 4/2004 | Shaylor | |
| 7,062,500 B1 | 6/2006 | Hall et al. | |
| 7,111,284 B2 | 9/2006 | Takagi et al. | |
| 7,143,076 B2 | 11/2006 | Weinberg et al. | |
| 7,143,101 B2 | 11/2006 | Oliver et al. | |
| 2003/0005418 A1 | 1/2003 | Sridhar et al. | |
| 2003/0172249 A1 * | 9/2003 | Ganapathy et al. | 712/35 |
| 2004/0123276 A1 | 6/2004 | Knueven et al. | |

OTHER PUBLICATIONS

"Numbers", http://www.gnu.org/software/kawa/internals/numbers.html, Date: 2005.

(Continued)

*Primary Examiner*—Don Wong
*Assistant Examiner*—Tuan-Khanh Phan
(74) *Attorney, Agent, or Firm*—Thorpe North & Western LLP (57) ABSTRACT

Various technologies and techniques are disclosed for providing a numeric tower that represents a structure supporting statically defined numeric data types. The numeric data types each are operable to implement a different but accurate representation of a particular value. Numeric operations are supported for the numeric tower that can be performed with any of the statically defined numeric data types. The numeric tower is extensible, and allows for additional statically defined numeric data types to be added, as well as operations. The numeric tower is also operable to detect overflow situations. For example, suppose a result of an operation will result in an overflow situation because the operation does not fit within a range supported by the particular numeric type. The system converts the numeric type to a different one of the numeric data types when the result does not fit within a range supported by the first one.

17 Claims, 8 Drawing Sheets

OTHER PUBLICATIONS

"Types, abstraction, and representation", http://www.cb1.com/~john/thesis/chapters/abstract-types.html, Date: 2004.

Ramsey, Norman, "ML Module Mania: A Type-Safe, Separately Compiled, Extensible Interpreter", Date: 2005, www.eecs.harvard.edu/nr/pubs/maniaws.ps.

Wang, Zhenyu, "Architecture Abstraction tower", Date: 1998, pp. 151-154, ACM Press, New York, USA, http://delivery.acm.org/10.1145/290000/288447/p151-wang.pdf?key1=2884478,key2=7627906611&coll=GUIDE&dl=GUIDE&CFID=6823568&CFTOKEN=29111039.

* cited by examiner

NUMERIC TOWER STRUCTURE  320

COMPLEX NUMBER TYPE DEFINITION  322

REPRESENT A VALUE THAT IS CAPABLE OF BEING EXPRESSED IN THE FORM OF A REAL NUMBER ADDED TO A REAL NUMBER MULTIPLIED BY AN IMAGINARY NUMBER (E.G. THE SQUARE ROOT OF -1)

REAL NUMBER TYPE DEFINITION  324

REPRESENT A VALUE THAT IS CAPABLE OF BEING EXPRESSED AS A FINITE OR INFINITE DECIMAL EXPANSION

RATIONAL NUMBER TYPE DEFINITION  326

REPRESENT A VALUE THAT IS CAPABLE OF BEING EXPRESSED AS A QUOTIENT OF TWO INTEGERS WHERE THE DENOMINATOR IS NOT ZERO

SIGNED AND/OR UN-SIGNED INTEGER NUMBER TYPE DEFINITION  328

REPRESENT A VALUE THAT CAN BE EXPRESSED A POSITIVE, ZERO, OR NEGATIVE WHOLE NUMBER

TOWER OF NUMERIC TYPES

BACKGROUND

In the abstract mathematical world, numbers are separated into different categories based on the operations you can perform on them. In the world of computers, categories differ based on representation. For example, in mathematics, there is no difference between 6/3 and 2, but on a computer, the first is represented by two integers and the second by one integer. At the most basic level, in mathematics, there are integers. These are numbers that we use most often (e.g. 1, 2, 3, 4, etc.), are the easiest to comprehend and represent, and are used by most computing devices. The next category of numbers in mathematics includes rational numbers. Rational numbers are defined to be anything that can be expressed as one integer divided by another integer. The next category includes real numbers. A real number is a value that is capable of being expressed in decimal notation (e.g. using a finite or infinite number of digits). The final category of numbers in the mathematical world includes complex numbers which are typically expressed as a+bi, where a and b are real numbers, and i is an imaginary unit representing $\sqrt{-1}$.

These abstract mathematical types are difficult to represent and interact with using a computer. As noted above, most computers use the integer category of numbers. Computers further sub-divide this category into more specific types, such as 8-bit integers, 16-bit integers, and several others. Numbers with a decimal point are commonly represented using floating point types, which approximate a real number to a particular precision. Furthermore, software programming languages allow the software developer to declare a variable that has a numeric type that matches these sub-divisions. In computer programming, if a programming language requires that all variables be of a specific type, then that language is called statically typed (or strongly typed).

One common problem that occurs with statically typed languages is the difficulty in performing basic mathematical operations between two different strongly-typed numeric types. For example, suppose you have a first variable that is an integer. Further suppose that you have a second variable that is a floating point number. If you try and perform an addition operation between the first variable and the second variable, you could receive a type conversion error.

SUMMARY

Various technologies and techniques are disclosed for providing a numeric tower that represents a structure supporting statically defined numeric data types. The numeric data types each are operable to implement a different but accurate representation of a particular value. Numeric operations are supported for the numeric tower that can be performed with any of the statically defined numeric data types. The numeric tower is extensible, and allows for additional statically defined numeric data types to be added. The numeric tower is also operable to detect overflow situations. For example, suppose a result of an operation will result in an overflow situation because the operation does not fit within a range supported by the particular numeric type. The system converts the numeric type to a different one of the numeric data types in the numeric tower when the result does not fit within a range supported by the first one.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is an exemplary diagram of a numeric tower and the various data type definition that one implementation may be composed of.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that creates statically typed numeric data types that are not traditionally represented in computer applications, but the system also serves other purposes in addition to these. In one implementation, one or more of the techniques described herein can be implemented as features within a software development program such as MICROSOFT® VISUAL STUDIO®, from a framework for providing software development such as MICROSOFT® .NET Framework, or from any other type of program or service that manipulates numeric data types. In another implementation, one or more of the techniques described herein are implemented as features within other applications that deal with statically typed data.

Abstract types are computer programs intended to represent information in a way that is independent of details of the particular representation of data. For example, an instance of the abstract type integer could be used to represent the mathematical idea of the number 22, without regard to whether this is represented using 8 bits, 16 bits, a sign bit, or a fixed point notation. An instance of an abstract type provides a set of operations that can be performed on the instance. For example, all instances of the abstract type integer would include operations such as negate, add, subtract, inverse and so forth. Concrete types are computer programs intended to implement a specific set of operations using a particular data representation. For example, byte represents an integer using 8 bits and all the operations on it compute either a byte or return an error if the result cannot be represented that way.

In one implementation, the system provides a numeric tower that provides a set of abstract ("mathematical") types which are implemented in terms of a user-specified set of concrete types. A typical numeric tower, for example, might include the abstract types number, complex-number, real-number, rational-number, and integer. These form a tower in the sense that all integers are rational-numbers, all rational-numbers are real-numbers, etc. One abstract type (say number) is said to be above another type (say integer) in the tower when any instance of the second type is an instance of the first type (all integers are numbers, so number is above integer in the tower).

A typical operation on an abstract type that is part of the tower would be "number multiply(number)" meaning that the operation has the name "multiply" and it takes as input a number and returns a number. This operation is available on all of the types in the tower—you can start with an integer or a real-number or a rational-number and multiply it by any number and get back another number.

Figure 1:
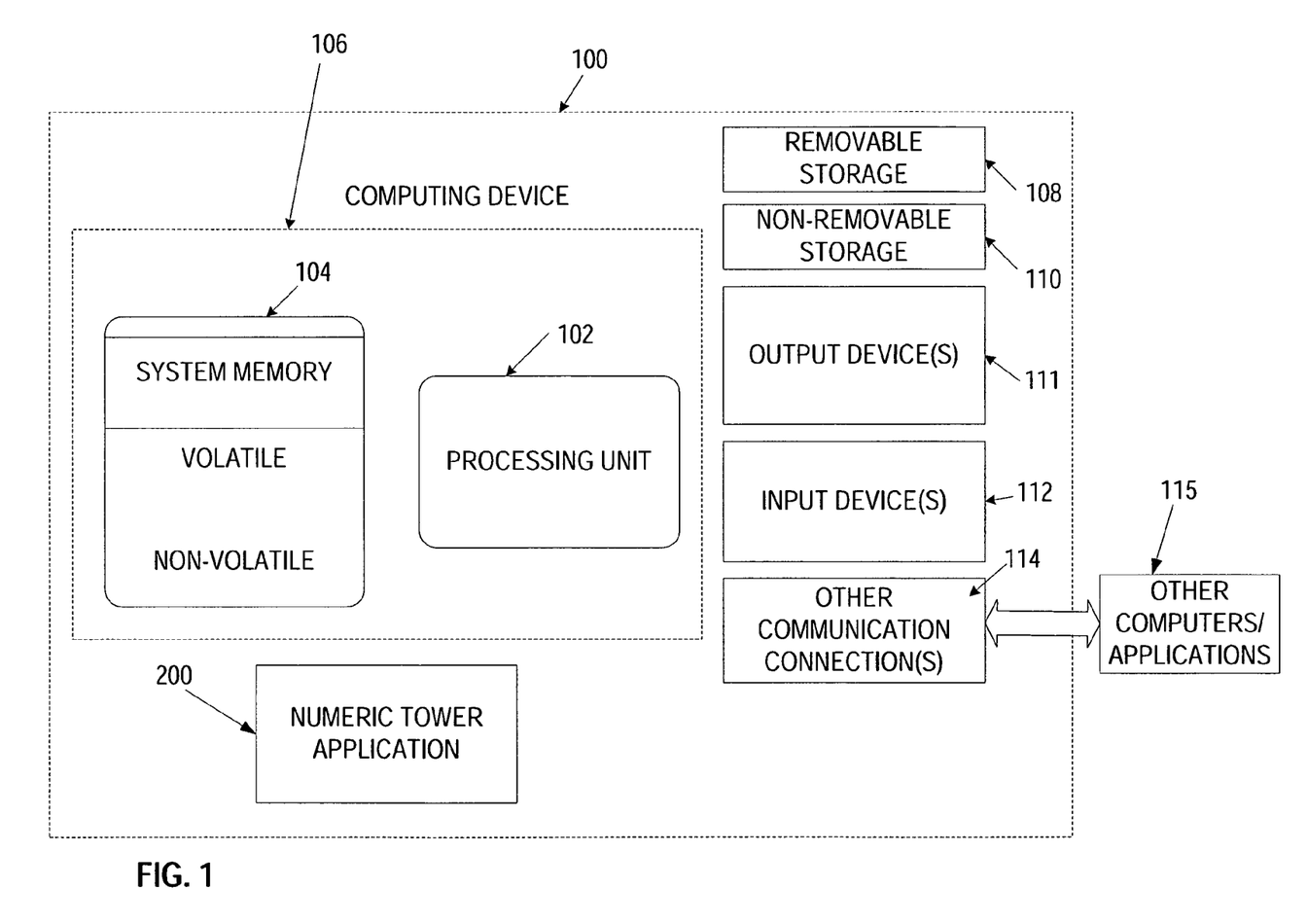
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes numeric tower application 200. Numeric tower application 200 will be described in further detail in FIG. 2.

Figure 2:
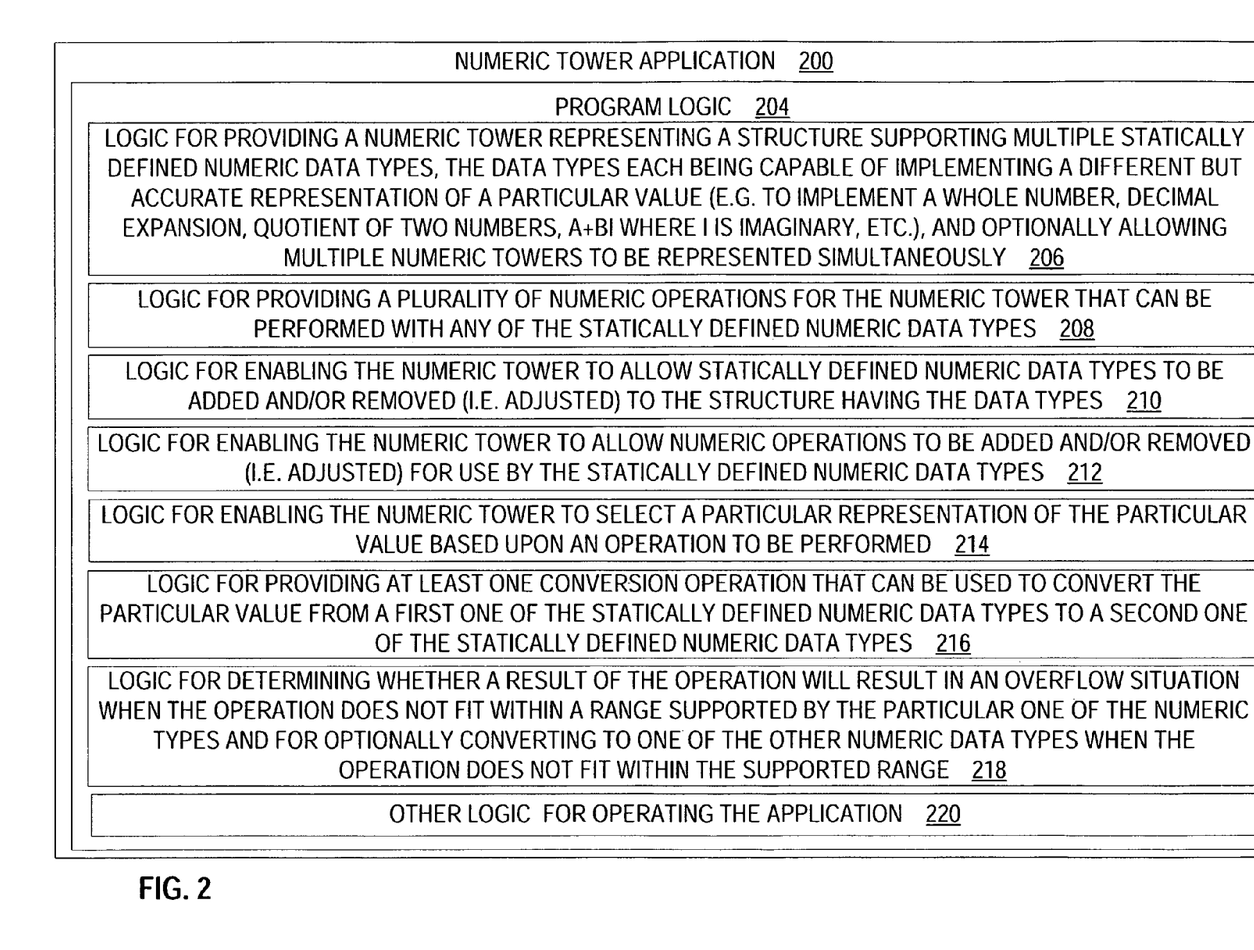
FIG. 2 is a diagrammatic view of a numeric tower application of one implementation operating on the computer system of FIG. 1.

Turning now to FIG. 2 with continued reference to FIG. 1, a numeric tower application 200 operating on computing device 100 is illustrated. Numeric tower application 200 is one of the application programs that reside on computing device 100. However, it will be understood that Numeric tower application 200 can alternatively or additionally be embodied as computer-executable instructions on one or more computers and/or in different variations than shown on FIG. 1. Alternatively or additionally, one or more parts of numeric tower application 200 can be part of system memory 104, on other computers and/or applications 115, or other such variations as would occur to one in the computer software art.

Numeric tower application 200 includes program logic 204, which is responsible for carrying out some or all of the techniques described herein. Program logic 204 includes logic for providing a numeric tower representing a structure supporting multiple statically defined numeric data types, the data types each being operable to implement a different but accurate representation of a particular value (e.g. to implement a whole number, decimal expansion, A+BI where I is imaginary, etc.), and optionally allowing multiple numeric towers to be represented simultaneously 206; logic for providing a plurality of numeric operations for the numeric tower that can be performed with any of the statically defined numeric data types 208; logic for enabling the numeric tower to allow statically defined numeric data types to be added and/or removed (i.e. adjusted) to the structure having the data types 210; logic for enabling the numeric tower to allow numeric operations to be added and/or removed (i.e. adjusted) for use by the statically defined numeric data types 212; logic for enabling the numeric tower to select a particular representation of the particular value based upon an operation to be performed 214; logic for providing at least one conversion operation that can be used to convert the particular value from a first one of the statically defined numeric data types to a second one of the statically defined numeric data types 216; logic for determining whether a result of the operation will result in an overflow situation when the operation does not fit within a range supported by the particular one of the numeric types and for optionally converting to one of the other numeric data types when the operation does not fit within the supported range 218; and other logic for operating the application 220. In one implementation, program logic 204 is operable to be called programmatically from another program, such as using a single call to a procedure in program logic 204. For example, a programming language (or other numeric tower consumer) may interpret the expression "2*π" as constructing an integer and a real number, then use the numeric tower to choose an appropriate representation for the operands and convert them, perform the multiplication, choose a representation for the result, and determine whether an overflow occurred.

Figure 3:
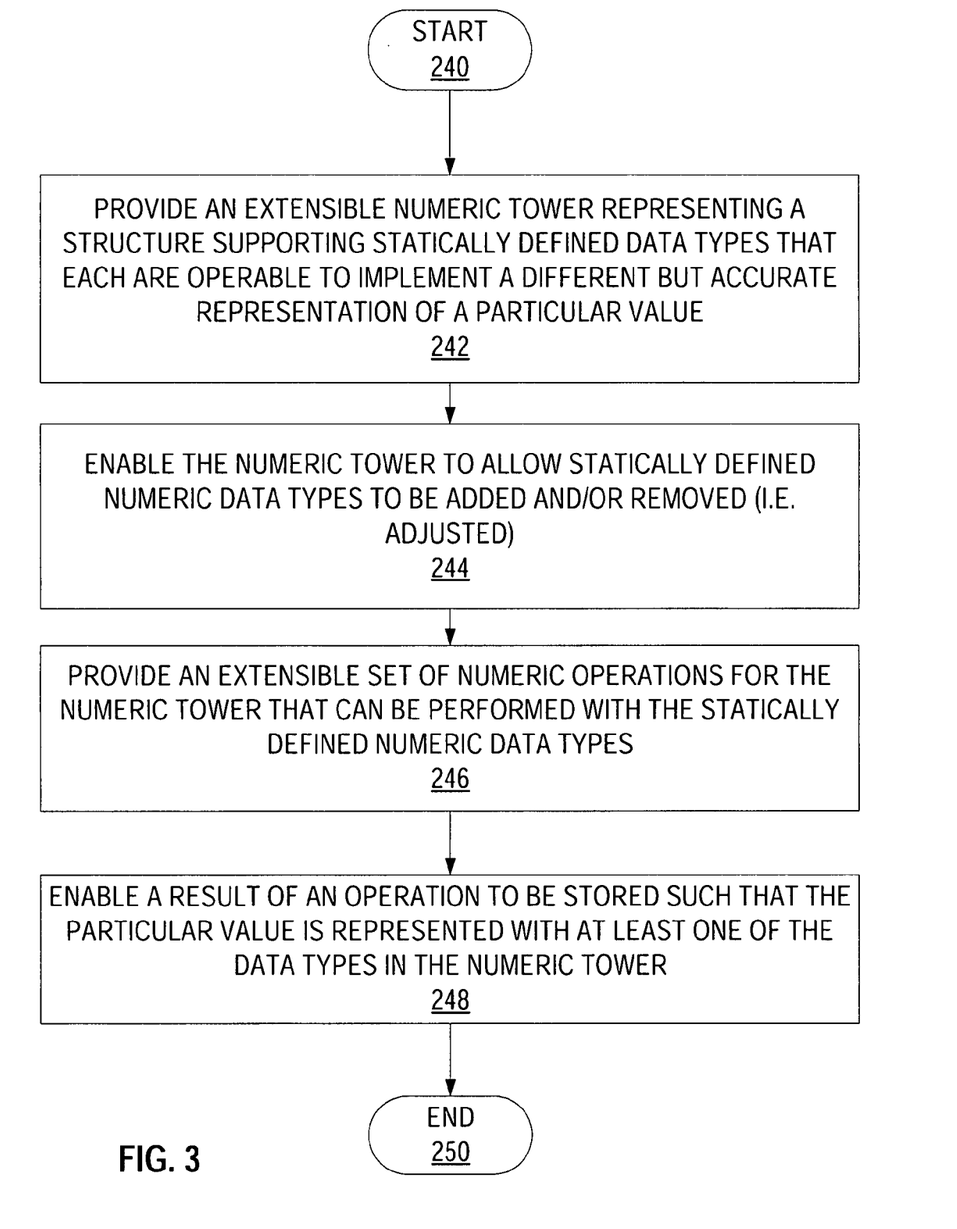
FIG. 3 is a high-level process flow diagram for one implementation of the system of FIG. 1 illustrating the stages involved in representing values in a numeric tower structure.

Turning now to FIGS. 3-7 with continued reference to FIGS. 1-2, the stages for implementing one or more implementations of numeric tower application 200 are described in further detail. FIG. 3 is a high level process flow diagram for numeric tower application 200 illustrating the stages involved in representing values in a numeric tower structure. In one form, the process of FIG. 3 is at least partially implemented in the operating logic of computing device 100. The process begins at start point 240 with providing an extensible numeric tower representing a structure supporting statically defined data types that each are operable to implement a different but accurate representation of a particular value (stage 242). In one implementation, the numeric tower has several features related to representing a particular value most appropriately. For example, the numeric tower puts the abstract types that form the tower into an order from lowest (like integer) to highest (like number). It associates concrete types (called "representations") with each abstract type, and orders these concrete types from "most restrictive" to "least restrictive." For example, the concrete type "8-bit integer" is typically considered more restrictive than "16-bit integer" and both are considered to be implementations of the abstract type "integer." Alternatively or additionally, the numeric tower provides an operation to take an instance of an abstract type and convert it to a less restrictive representation type, either of the same abstract type or of a higher abstract type. This is called an upward conversion and is expected to succeed in the usual case. The term conversion as used herein is meant to include a value-preserving transformation. For example, it might take an integer (an abstract type) which is represented as an 8-bit integer (concrete type) and return the same number but represented at a 16-bit integer (concrete type). It might take a 64-bit integer (concrete type) and return the same number as a rational number made from two infinite precision integers (concrete type). Alternatively or additionally, the numeric tower provides an operation which takes an instance an abstract type and converts it to a more restrictive representation type. This is called a downward conversion and it is to be expected that this operation may fail. For example, attempting to downward convert a rational number of 3/2 will typically fail because there it cannot be represented in any integer concrete type. In another implementation, transformations that do not precisely preserve the value, called "coercions", may alternatively or additionally be provided.

The numeric tower is able to allow statically defined numeric data types to be added and/or removed (i.e. adjusted) (stage 244). An extensible set of numeric operations are provided for the numeric tower that can be performed with the statically defined numeric data types (stage 246). These extensible numeric operations can be added and/or removed. The numeric tower provides a framework for implementing these generic operations. A generic operation like "number multiply(number)" starts with a concrete representation (the "self" operand) and another concrete representation and uses the upward conversion operation on each until it finds a pair of representations that actually implement multiplication of the two concrete types. It then takes the result and downward converts the result until it finds the lowest representation that can hold the result. Thus, if you start with an 8-bit integer representing 2 and a rational representing 3/2 it would first upward convert the 2 to a rational of 2/1, then multiply the two rationals 2/1 and 3/2 to get a rational of 6/2, then downward convert this to get the 8-bit integer 3. A result of an operation is stored such that the particular value is represented with at least one of the data types in the numeric tower (stage 248). The process ends at end point 250.

Figure 4:
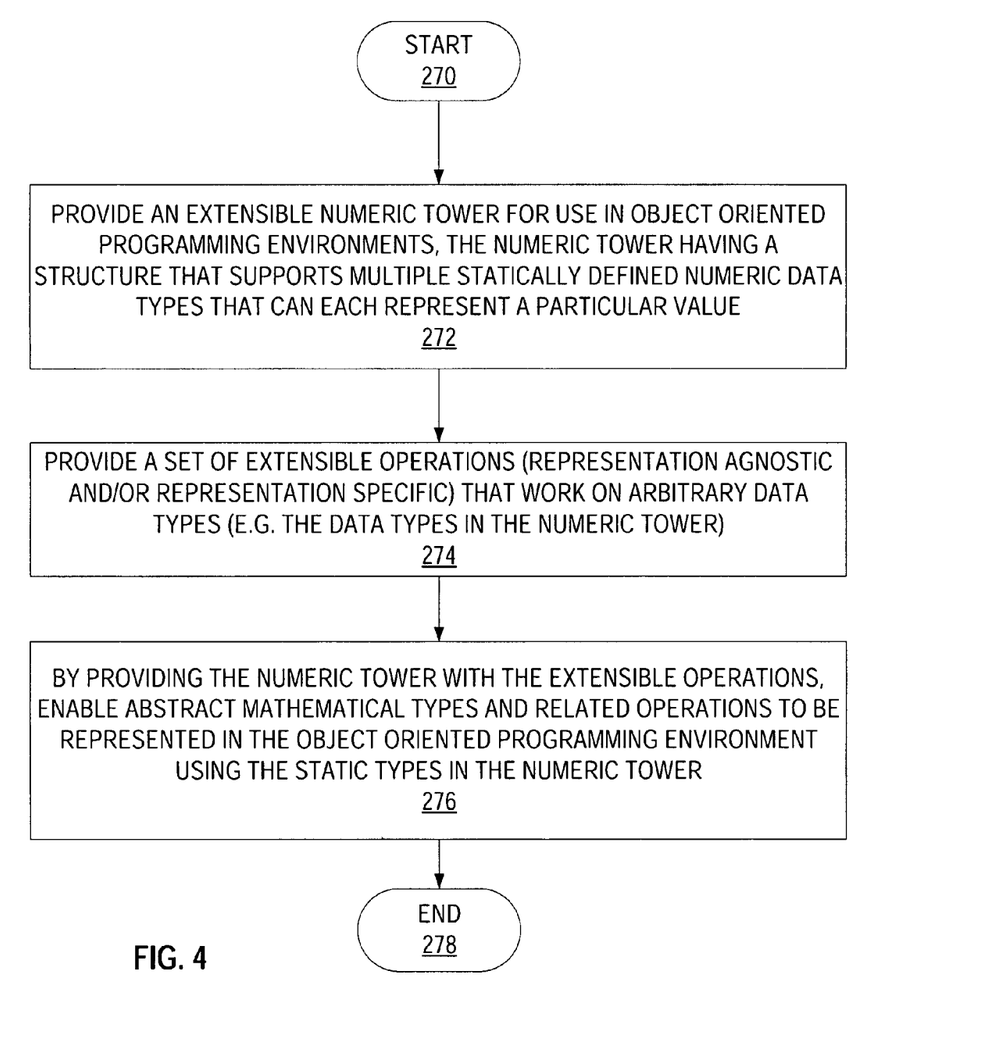
FIG. 4 is a process flow diagram for one implementation of the system of FIG. 1 illustrating the stages involved in extending the numeric tower with new types and operations.

FIG. 4 illustrates one implementation of the stages involved in extending the numeric tower with new types and operations. In one form, the process of FIG. 4 is at least partially implemented in the operating logic of computing device 100. The process begins at start point 270 with providing an extensible numeric tower for use in objected oriented programming environments, the numeric tower having a structure that supports multiple statically defined numeric data types that can each represent a particular value (stage 272). A set of extensible operations are provided that work on arbitrary data types (e.g. the data types in the numeric tower) (stage 274). The set of extensible operations can be representation agnostic and/or representation specific. By providing the numeric tower with the extensible operations, abstract mathematical types and related operations can be represented in the object oriented programming environment using the static types in the numeric tower (stage 276). The process ends at end point 278.

Figure 5:
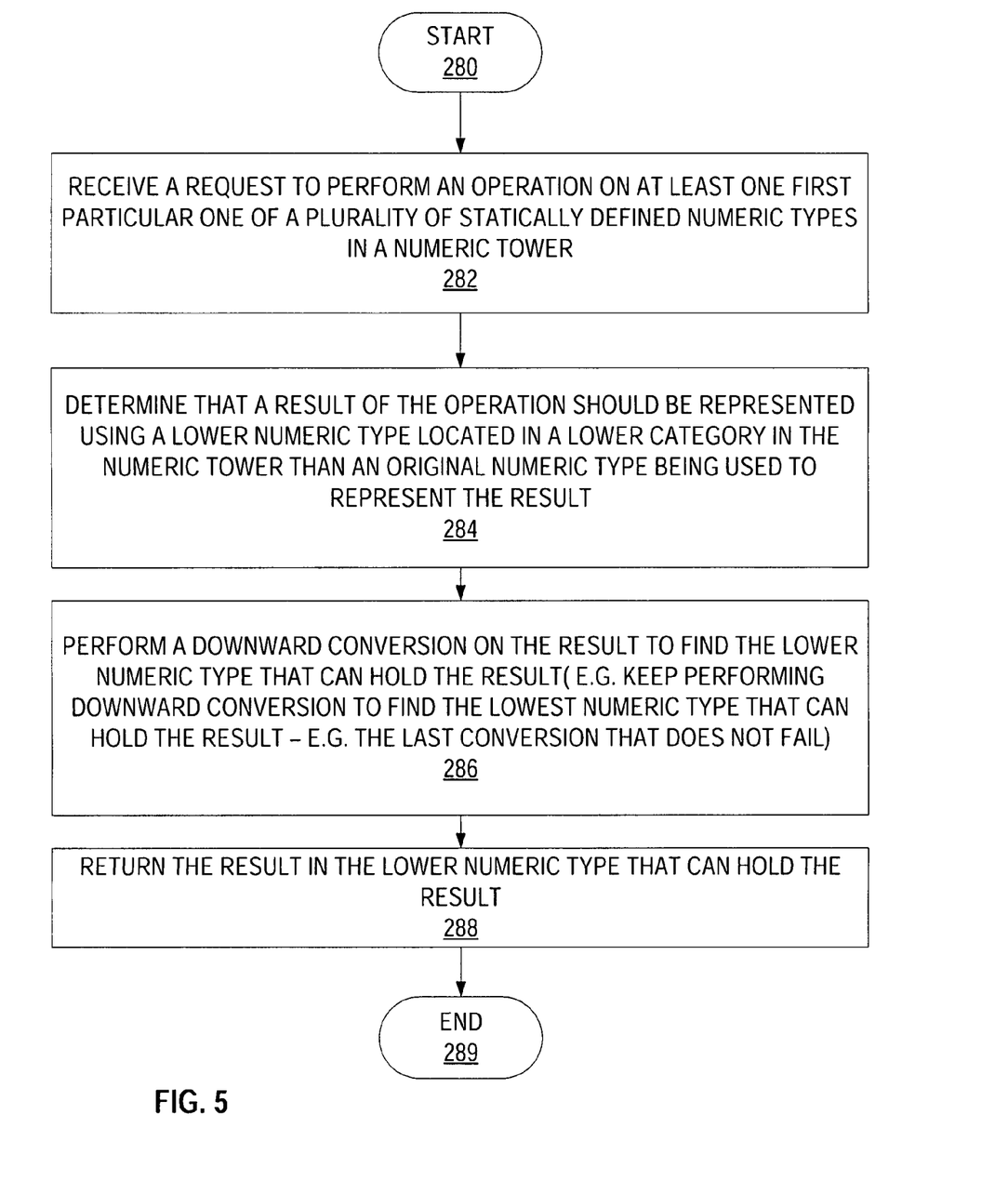
FIG. 5 is a process flow diagram for one implementation of the system of FIG. 1 illustrating the stages involved in performing a downward conversion to a result of an operation.

FIG. 5 illustrates one implementation of the stages involved in performing a downward conversion to a result of an operation. In one form, the process of FIG. 5 is at least partially implemented in the operating logic of computing device 100. The process begins at start point 280 with receiving a request to perform an operation on at least one first particular one of a plurality of statically defined numeric types in a numeric tower (stage 282). The system determines that a result of the operation should be represented using a lower numeric type located in a lower category in the numeric tower than an original numeric type being used to represent the result (stage 284). The system performs downward conversions to find the lowest numeric type that can hold the result—e.g. by stopping with the numeric type associated with the last conversion that does not fail (stage 286). The result is returned in the lowest numeric type that can hold the result (stage 288). The process ends at end point 289.

Figure 6:
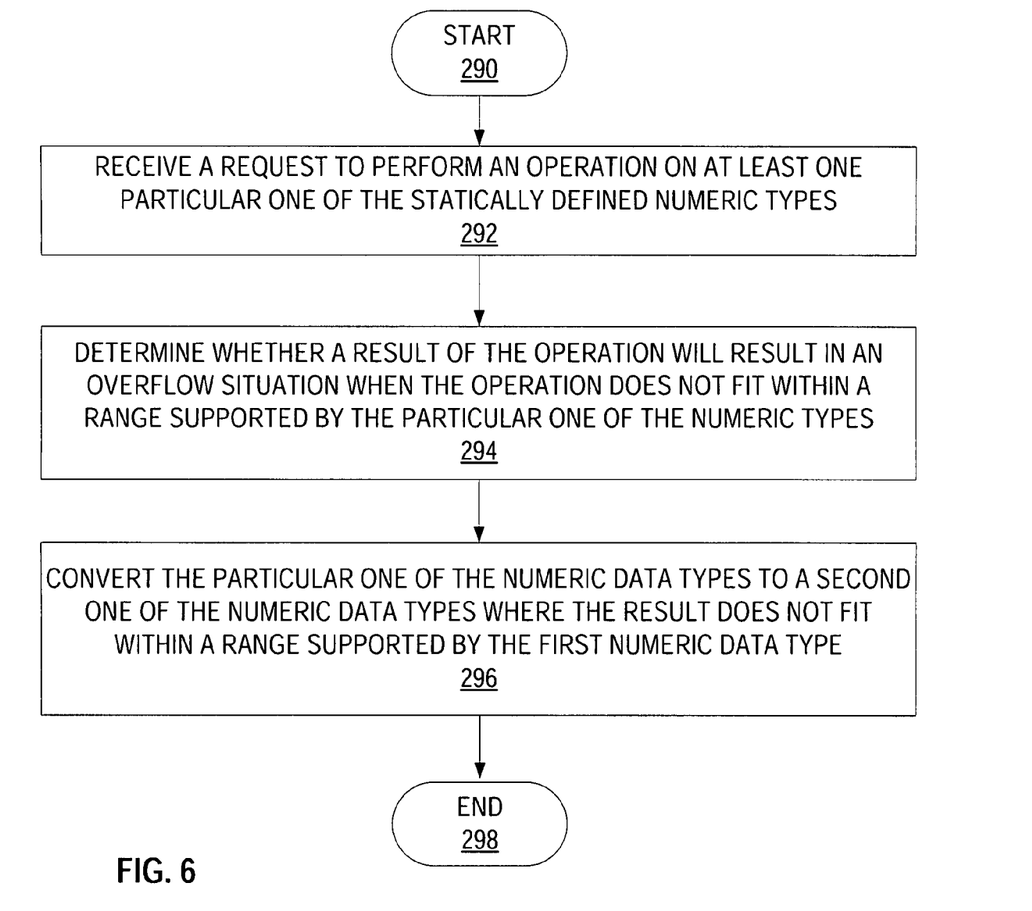
FIG. 6 is a process flow diagram for one implementation of the system of FIG. 1 illustrating the stages involved in handling overflow situations.

FIG. 6 illustrates one implementation of the stages involved in handling overflow situations. In one form, the process of FIG. 6 is at least partially implemented in the operating logic of computing device 100. The process begins at start point 290 with receiving a request to perform an operation on at least one particular one of the statically defined numeric types (stage 292). The system determines whether a result of the operation will result in an overflow situation when the operation does not fit within a range supported by the particular one of the numeric types (stage 294). The particular one of the numeric data types is converted to a second one of the numeric data types where the result does not fit within a range supported by the first numeric data type (stage 296). The process ends at end point 298.

Figure 7:
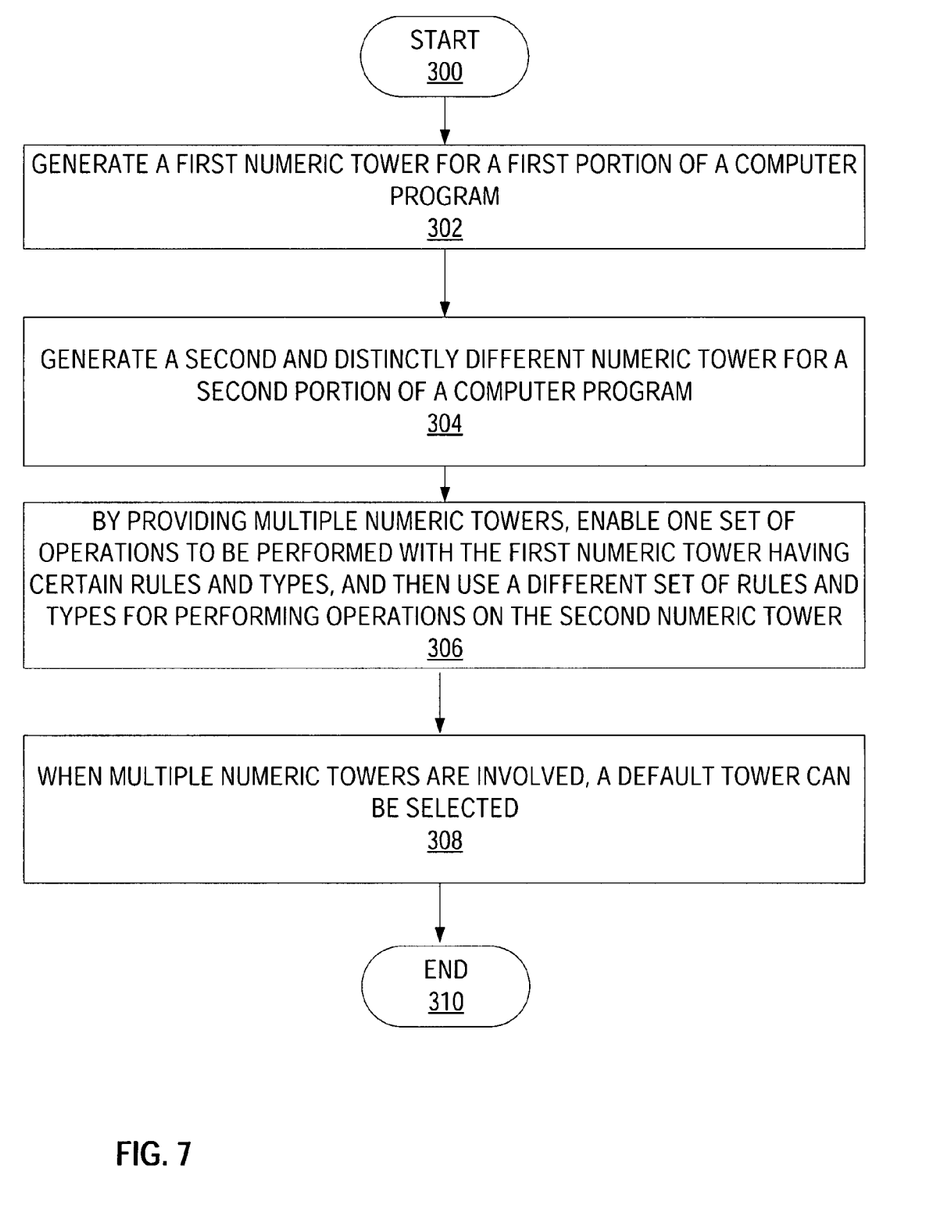
FIG. 7 is a process flow diagram for one implementation of the system of FIG. 1 illustrating the stages involved in using multiple numeric towers by different parts of a computer program.

FIG. 7 illustrates one implementation of the stages involved in using multiple numeric towers with different parts of a computer program. In one form, the process of FIG. 7 is at least partially implemented in the operating logic of computing device 100. The process begins at start point 300 with generating a first numeric tower for a first portion of a computer program (stage 302). The system generates a second and distinctly different numeric tower for a second portion of a computer program (stage 304). In one implementation, the numeric towers are different because different programming languages have a different set of common types exposed in them. By providing multiple numeric towers, it is possible to perform one set of operations with the first numeric tower having certain rules and types, and then use a different set of rules and types for performing operations on the second numeric tower (stage 306). When multiple numeric towers are involved (e.g. such as a program that wants to evaluate expressions using multiple language's rules, perhaps because the application's components were written within multiple languages), a default tower can be selected (stage 308).

In one implementation, the multiple numeric towers are implemented by using different instances of a numeric tower. In another implementation, the multiple numeric towers are implemented by using static variables with process space isolation to construct multiple non-overlapping towers. The process ends at end point 310.

Figure 8:
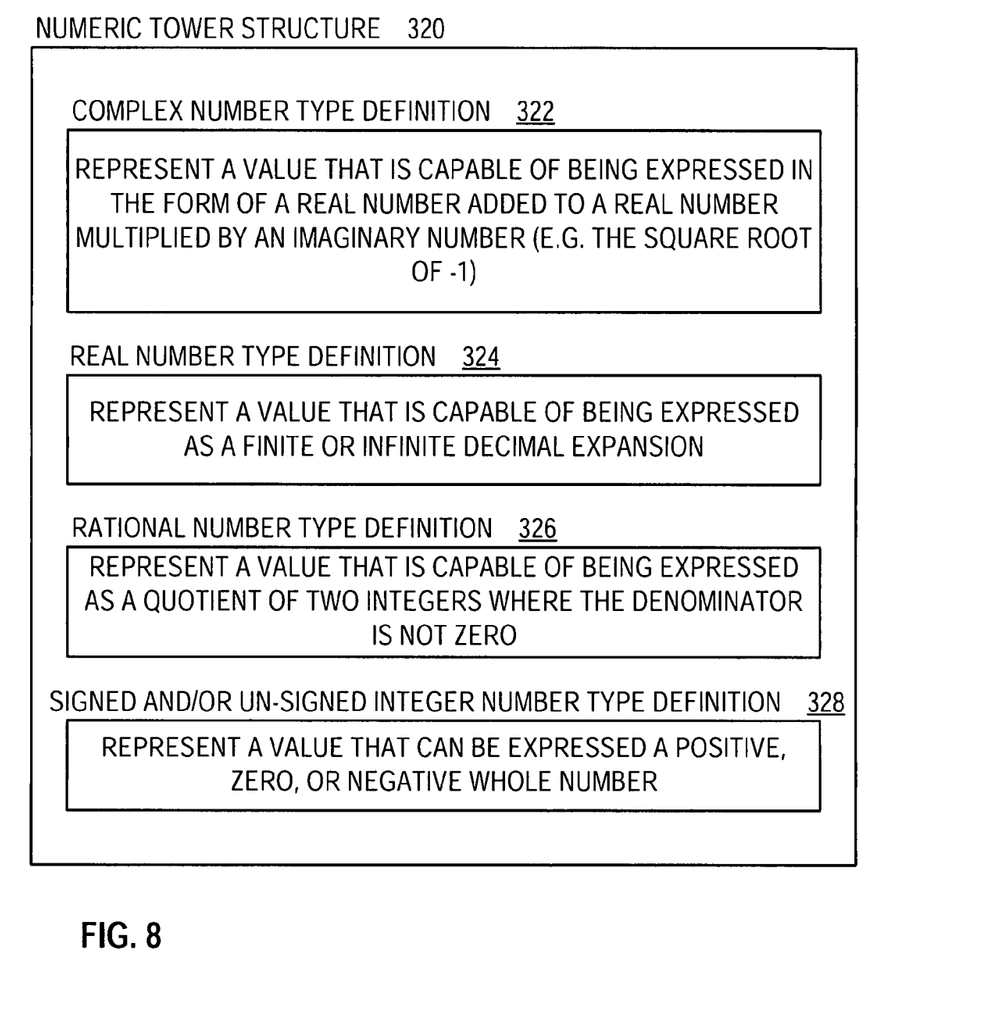

FIG. 8 illustrates an exemplary numeric tower structure 320 and the data types it contains. In one form, the structures of FIG. 8 are at least partially implemented in the operating logic of computing device 100. At the bottom of number tower application 320 is a signed and/or un-signed integer number type 328, which is defined as values that can be expressed as a positive, zero, or negative whole number. The next level of the numeric tower is a rational number type 326, which is defined as a value that is capable of being expressed as a quotient of two integers where the denominator is not zero. The next level of the numeric tower is a real number type 324, which is defined as a value that is capable of being expressed in decimal notation (using a finite or infinite number of digits). The final level of the numeric tower is a complex number type 322 which is defined as a real number added to a real number multiplied by an imaginary number (e.g. the square root of −1). While four numeric data types are shown in the example numeric tower 320, in other implementations, some, all, and/or additional numeric data types can be included in the numeric tower. The system allows the next data type in the list to be chosen to represent a particular value if that type would be better for handling a particular situation. In one implementation, the system also allows for the result of an operation to be converted downward in the tower if that result is capable of being represented by one of the lower levels. One non-limiting example of when such "downward conversion" may be used is if the result of an operation performed on two rational numbers results in a value that can be represented by an integer.

In one implementation, by enabling the correct data type to be used in the numeric tower for a particular situation, overflow situations can be avoided and/or solved.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium having computer executable instructions for causing a computer to perform steps, comprising:
    providing a numeric tower, the numeric tower representing a structure supporting a plurality of statically defined numeric data types in a memory, the numeric data types each being a different but accurate representation of a particular value;
    providing a plurality of numeric operations for the numeric tower to perform with any of the statically defined numeric data types using a processing unit;
    enabling the numeric tower to select a particular representation of the particular value based on a numeric operation to be performed;
    providing at least one conversion operation for the numeric tower to up convert the particular value to a less restrictive representation type or down convert the particular value to a more restrictive representation type from one of the statically defined numeric data types to another one of the statically defined numeric data types using a processing, wherein the numeric tower is configured to allow statically defined data types be adjusted within the structure having the plurality of statically defined data types; and
    determining whether a result of the numeric operation will result in an overflow situation when the numeric operation does not fit within a range supported by the particular one of the numeric data types and converting to one of the other numeric data types when the numeric operation does not fit within a supported range.

2. The computer-readable storage medium of claim 1, wherein the numeric tower represents the particular value using at least one of the data types.

3. The computer-readable storage medium of claim 1, wherein the numeric tower is configured to report a failure when an exception occurs.

4. The computer-readable storage medium of claim 1, wherein the numeric tower is configured to allow numeric operations to be adjusted for use by the plurality of statically defined data types.

5. The computer-readable storage medium of claim 1, wherein one of the statically defined data types represents the particular value as a whole number.

6. The computer-readable storage medium of claim 1, wherein one of the statically defined data types represents the particular value as a quotient of two integers where a denominator is not zero.

7. The computer-readable storage medium of claim 1, wherein one of the statically defined data types represents the particular value as a finite or infinite decimal expansion.

8. The computer-readable storage medium of claim 1, wherein one of the statically defined data types represents the particular value expressed in a form of a real number added to a real number multiplied by an imaginary number.

9. The computer-readable storage medium of claim 1, further having computer executable instructions for causing a computer to perform the step comprising: allow more than one of the numeric tower to be represented simultaneously.

10. A method for providing an extensible numeric tower of numeric data types comprising the steps of:
    providing an extensible numeric tower in a memory, the extensible numeric tower representing a structure supporting a plurality of statically defined numeric data types, the plurality of numeric data types each being configured to implement a different but accurate representation of a particular value;
    representing statically defined data types in the extensible numeric tower including: a whole number, a quotient of two integers where a denominator is not zero, a finite or infinite decimal expansion, and a real number added to a real number multiplied by an imaginary number;
    enabling the numeric tower to select a particular representation of a particular value based on a numeric operation to perform and providing an extensible set of numeric operations for the numeric tower to perform with the statically defined numeric data types, wherein the numeric tower is configured to allow statically defined data types be adjusted within the structure having the plurality of statically defined data types;
    determining whether a result of the numeric operation will result in an overflow situation when the numeric operation does not fit within a range supported by the particular one of the numeric types and converting to one of the other numeric data types when the numeric operation does not fit within a supported range;
    allowing additional statically defined numeric data types to be added to the plurality of numeric data types by a processing unit.

11. The method of claim 10, wherein the numeric tower includes a definition for converting from a particular statically defined type to at least one other particular statically defined type within the numeric tower.

12. The method of claim 10, wherein the numeric tower reports a failure when an exception occurs.

13. The method of claim 10, wherein the numeric tower allows a result of an operation to be stored such that the particular value is represented with at least one of the numeric data types.

14. A method for performing a downward conversion of numeric types based upon an operation performed on at least one statically defined numeric type in a memory coupled to a processing unit, consisting of:
- receiving a request to perform an operation on at least one first particular one of a plurality of statically defined numeric types in a numeric tower in the memory;
- enabling the numeric tower to select a particular representation of a particular value based on a numeric operation to be performed, wherein the numeric tower is configured to allow statically defined data types be adjusted within the structure having the plurality of statically defined data types;
- determining that a result of the operation using the processing unit should be represented using a lower numeric type located in a lower category in the numeric tower as the result of an overflow situation when the numeric operation does not fit within a range supported by the particular one of the numeric types and converting to one of the other numeric data types when the operation does not fit within a supported range;
- performing a downward conversion on the result using the processing unit to find a lower numeric type that can hold the result; and
- returning the result in the lower numeric type that can hold the result and be stored in the memory.

15. The method of claim 14, wherein the downward conversion is performed using the processing unit one or more times to find the lowest numeric type that can hold the result.

16. The method of claim 15, wherein the lowest numeric type that can hold the result is a last particular numeric type that does not fail the downward conversion using the processing unit.

17. A computer-readable storage medium having computer-executable instructions for causing a computer to perform the steps recited in claim 14.

* * * * *